(12) United States Patent
Davis

(10) Patent No.: US 9,357,756 B2
(45) Date of Patent: Jun. 7, 2016

(54) PEDESTAL MOUNTABLE BAIT HOLDING DEVICE

(71) Applicant: Chris J. Davis, Wynne, AR (US)

(72) Inventor: Chris J. Davis, Wynne, AR (US)

( * ) Notice: Subject to any disclaimer, the term of this patent is extended or adjusted under 35 U.S.C. 154(b) by 153 days.

(21) Appl. No.: 14/248,407

(22) Filed: Apr. 9, 2014

(65) Prior Publication Data

US 2015/0289494 A1    Oct. 15, 2015

(51) Int. Cl.
*A01K 97/04*    (2006.01)
*A01K 97/06*    (2006.01)
*A47C 7/62*    (2006.01)

(52) U.S. Cl.
CPC ............ *A01K 97/04* (2013.01); *A01K 97/06* (2013.01); *A47C 7/62* (2013.01)

(58) Field of Classification Search
CPC ....... A01K 97/04; A01K 97/06; A01K 97/00; A47C 7/62
USPC ............... 43/54.1, 55; 248/311.2, 312.1, 312, 248/313, 315; 297/188.2, 188.01, 188.08, 297/188.21

See application file for complete search history.

(56) References Cited

U.S. PATENT DOCUMENTS

| | | | | |
|---|---|---|---|---|
| 936,104 A * | 10/1909 | Ernest | B60J 3/0217 248/315 |
| 2,346,744 A * | 4/1944 | Glassman | A01K 97/04 217/5 |
| 2,357,214 A * | 8/1944 | McDole | A01K 97/06 190/8 |
| 2,493,084 A * | 1/1950 | Pharo | A47C 4/14 297/135 |
| 2,538,853 A * | 1/1951 | Worl | A01K 97/04 43/55 |
| 2,540,758 A * | 2/1951 | Rinnman | F24F 3/1411 43/55 |
| 2,572,763 A * | 10/1951 | Robertson | A01K 97/04 43/55 |
| 2,573,352 A * | 10/1951 | Nicodemus | A01K 97/20 43/55 |
| 2,597,002 A * | 5/1952 | Johnson | A01K 97/05 43/55 |
| 2,715,293 A * | 8/1955 | Martin | A01K 97/05 43/55 |
| 2,722,770 A * | 11/1955 | Giordano | A01K 97/05 43/55 |
| 2,732,653 A * | 1/1956 | McGee | A01K 97/04 43/55 |
| 2,780,887 A * | 2/1957 | Cabaniss | A01K 97/04 43/55 |
| 2,843,968 A * | 7/1958 | Dohrer | A01K 97/04 43/55 |
| 2,948,986 A * | 8/1960 | Williamson | A01K 97/04 43/55 |
| 2,949,691 A * | 8/1960 | Johnson | A01K 97/04 43/55 |
| 2,995,333 A * | 8/1961 | Pazzano | A47C 7/62 248/311.2 |
| 3,116,046 A * | 12/1963 | Risdon | A47C 7/62 297/188.2 |
| 3,143,263 A * | 8/1964 | Farmer | A01K 97/04 224/235 |
| D203,055 S * | 11/1965 | Robinson | D7/620 |
| 3,269,683 A * | 8/1966 | Shinaver | F16M 13/02 248/313 |

(Continued)

*Primary Examiner* — Darren W Ark

(57) ABSTRACT

A pedestal mountable bait holding device holds bait, such as crickets, in an elevated position to be easily accessed while fishing. The device includes a rod having a top end and a bottom end. A collar is coupled to the bottom end of the rod wherein the rod is configured for being coupled to and extending upwardly and away from a pedestal extending through the collar. A bucket is coupled to the top end of the rod.

5 Claims, 4 Drawing Sheets

(56) References Cited

U.S. PATENT DOCUMENTS

| | | | | |
|---|---|---|---|---|
| 3,272,376 | A * | 9/1966 | Tierney | A01M 3/00 43/55 |
| 3,315,402 | A * | 4/1967 | Scott | A01K 97/04 43/55 |
| 3,344,551 | A * | 10/1967 | Chestnut | A01K 97/10 43/55 |
| 3,881,677 | A * | 5/1975 | Ihlenfeld | A47C 7/62 248/311.2 |
| D239,015 | S * | 3/1976 | Stout | 43/21.2 |
| 4,063,701 | A * | 12/1977 | Wray | A47C 7/62 248/292.14 |
| 4,112,607 | A * | 9/1978 | Scher | A01K 97/10 43/17 |
| 4,184,281 | A * | 1/1980 | Corby | A01K 97/05 114/363 |
| 4,213,649 | A * | 7/1980 | Sell | A47C 7/62 248/231.81 |
| 4,270,724 | A * | 6/1981 | McMullen | A16M 13/02 248/230.4 |
| 4,428,617 | A * | 1/1984 | Lawson | A01K 97/06 114/363 |
| 4,450,647 | A * | 5/1984 | Schmidt | A01K 97/05 43/55 |
| 4,497,129 | A * | 2/1985 | Chestnut | A01K 97/10 43/55 |
| 4,500,059 | A * | 2/1985 | Papizan | A01K 97/06 206/315.11 |
| 4,560,128 | A * | 12/1985 | Willeby | A47C 7/62 24/517 |
| 4,645,167 | A * | 2/1987 | Hardwick | B62B 29/04 248/283.1 |
| 4,745,704 | A * | 5/1988 | Schaefer | A45C 5/00 297/188.12 |
| 4,823,723 | A * | 4/1989 | Brooks | A01K 97/10 114/343 |
| 4,825,577 | A * | 5/1989 | Brannon | A01K 97/04 43/55 |
| 4,864,769 | A * | 9/1989 | Sandahl | A01K 97/05 43/55 |
| 4,887,379 | A * | 12/1989 | Harrison | B63B 29/04 297/188.12 |
| 4,999,943 | A * | 3/1991 | Crabtree | A01K 97/06 43/54.1 |
| 5,000,412 | A * | 3/1991 | Sheehan | A01K 97/06 248/286.1 |
| 5,163,648 | A * | 11/1992 | Schneider | A01K 97/05 248/154 |
| 5,295,650 | A * | 3/1994 | Brandt | A47C 7/68 248/311.2 |
| 5,325,620 | A * | 7/1994 | Reed | A01K 97/10 211/70.8 |
| 5,356,107 | A * | 10/1994 | Sinohuiz | A47C 7/62 248/223.41 |
| 5,377,445 | A * | 1/1995 | Brannon | A01K 97/04 222/556 |
| D357,613 | S * | 4/1995 | Schultz | D7/620 |
| 5,481,822 | A * | 1/1996 | Engels | A01K 97/06 297/188.12 |
| D371,595 | S * | 7/1996 | Pieper | D22/147 |
| 5,560,145 | A * | 10/1996 | Anderson | A01K 97/06 403/373 |
| 5,586,804 | A * | 12/1996 | Burroughs | A47C 7/70 297/188.08 |
| 5,597,148 | A * | 1/1997 | Gospodarich | A47C 7/68 248/230.5 |
| D399,367 | S * | 10/1998 | Sieland | D22/147 |
| 5,823,496 | A * | 10/1998 | Foley | A47G 23/0225 248/311.2 |
| 5,899,527 | A * | 5/1999 | Elvidge | A01K 97/22 297/188.01 |
| 5,987,804 | A * | 11/1999 | Shearer | A01K 97/10 43/21.2 |
| 5,992,804 | A * | 11/1999 | Johnson | B63B 29/06 114/363 |
| 6,129,051 | A * | 10/2000 | Jessie | A01K 67/033 119/452 |
| 6,227,510 | B1 * | 5/2001 | McMullen, Sr. | A47C 7/68 248/311.2 |
| 6,681,517 | B1 * | 1/2004 | Solomon | A01K 97/10 43/21.2 |
| 6,808,231 | B1 * | 10/2004 | Hill | B60R 9/06 296/26.09 |
| 7,047,688 | B2 * | 5/2006 | Sandman, Jr. | A01K 97/10 248/512 |
| 7,389,608 | B1 * | 6/2008 | MacKay | A01K 97/05 206/315.11 |
| 7,533,931 | B1 * | 5/2009 | Bryant, Sr. | A47C 7/62 297/188.08 |
| 7,650,713 | B1 * | 1/2010 | Peede | A01K 97/10 43/21.2 |
| 2005/0039377 | A1 * | 2/2005 | Clary | A01K 97/06 43/54.1 |
| 2005/0086851 | A1 * | 4/2005 | Carden, Jr. | A01K 97/05 43/55 |
| 2005/0126064 | A1 * | 6/2005 | Winkler | A01K 97/06 43/21.2 |
| 2007/0283614 | A1 * | 12/2007 | Kessler | A01K 97/06 43/54.1 |
| 2009/0032657 | A1 * | 2/2009 | Huang | A47G 23/0225 248/311.2 |
| 2009/0119975 | A1 * | 5/2009 | Yearack | A01K 97/06 43/54.1 |
| 2009/0139132 | A1 * | 6/2009 | Knight | A01K 97/06 43/54.1 |
| 2010/0313464 | A1 * | 12/2010 | Bain | A01K 97/22 43/54.1 |
| 2014/0203600 | A1 * | 7/2014 | Rushing | A47C 7/62 297/188.21 |
| 2014/0284443 | A1 * | 9/2014 | Forbes | G09F 21/04 248/313 |

\* cited by examiner

PEDESTAL MOUNTABLE BAIT HOLDING DEVICE

BACKGROUND OF THE DISCLOSURE

Field of the Disclosure

The disclosure relates to bait holding devices and more particularly pertains to a new bait holding device for holding bait such as crickets in an elevated position to be easily accessed while fishing.

SUMMARY OF THE DISCLOSURE

An embodiment of the disclosure meets the needs presented above by generally comprising a rod having a top end and a bottom end. A collar is coupled to the bottom end of the rod wherein the rod is configured for being coupled to and extending upwardly and away from a pedestal extending through the collar. A bucket is coupled to the top end of the rod.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
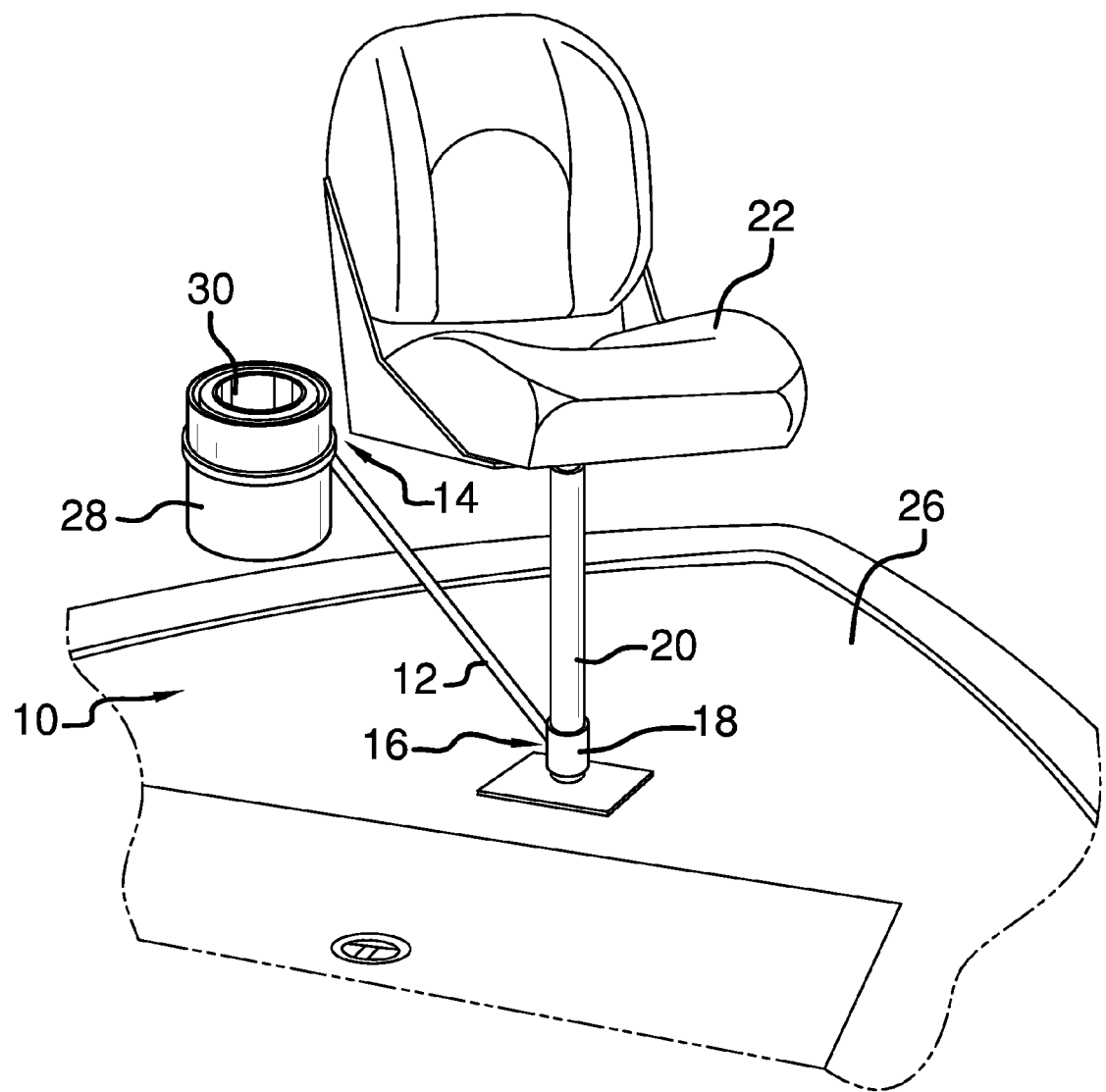
FIG. 1 is a top front side perspective view of a pedestal mountable bait holding device according to an embodiment of the disclosure.
Figure 2:
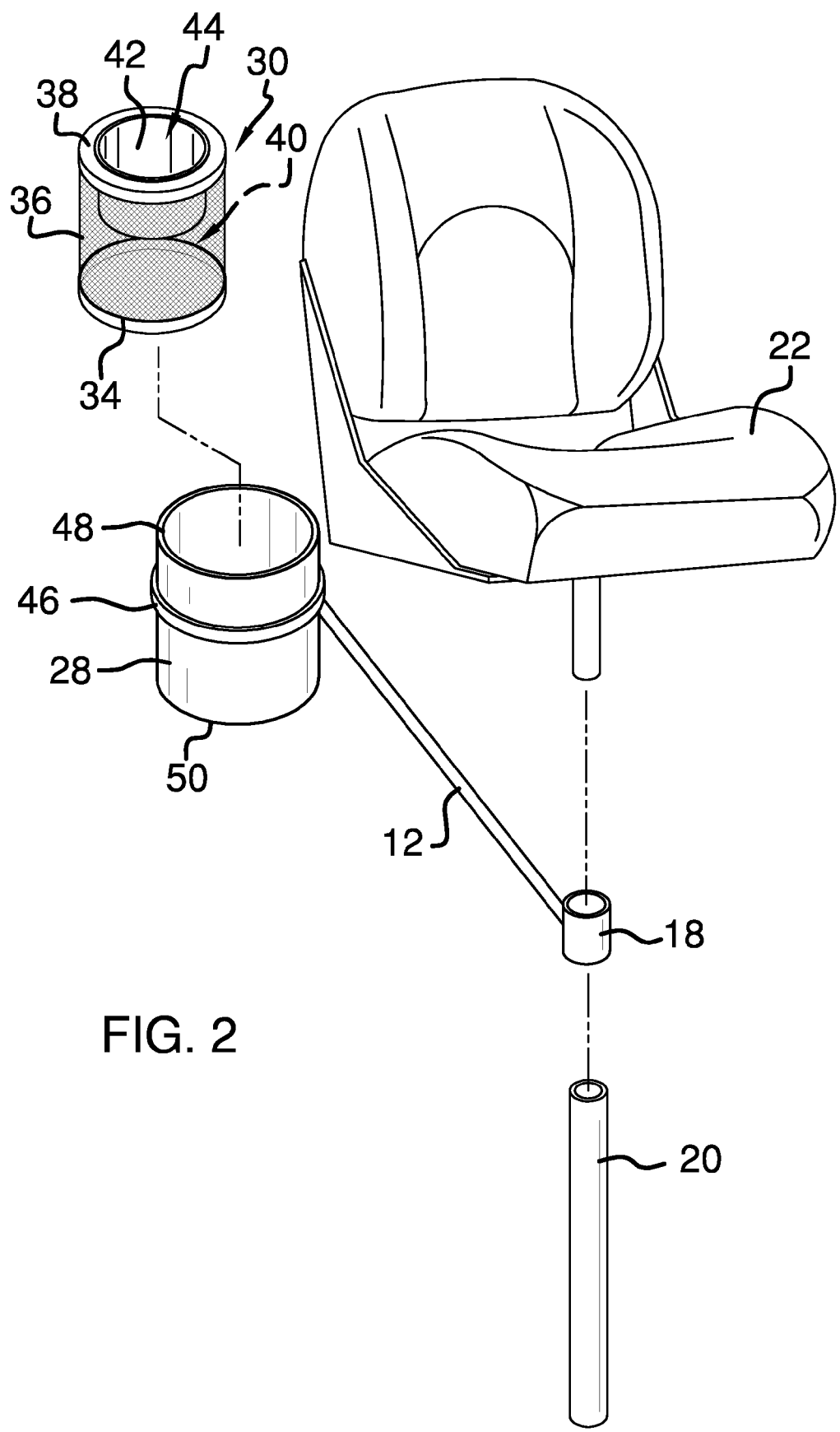
FIG. 2 is a partially exploded top front side perspective view of an embodiment of the disclosure in use.
Figure 3:
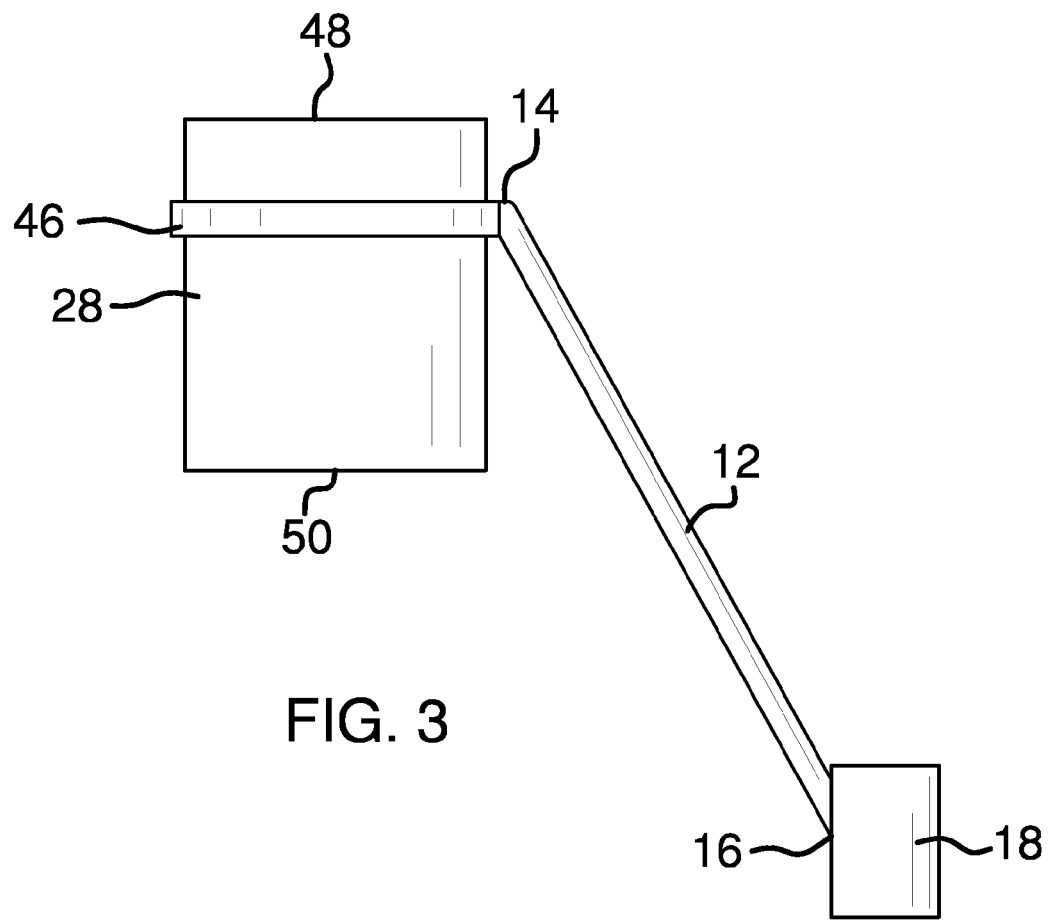
FIG. 3 is a side view of an embodiment of the disclosure.
Figure 4:
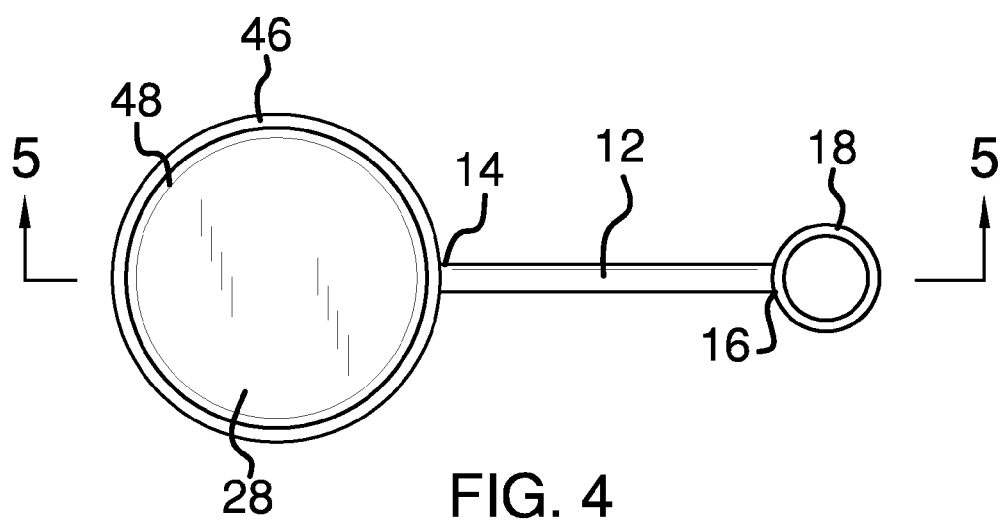
FIG. 4 is a bottom view of an embodiment of the disclosure.
Figure 5:
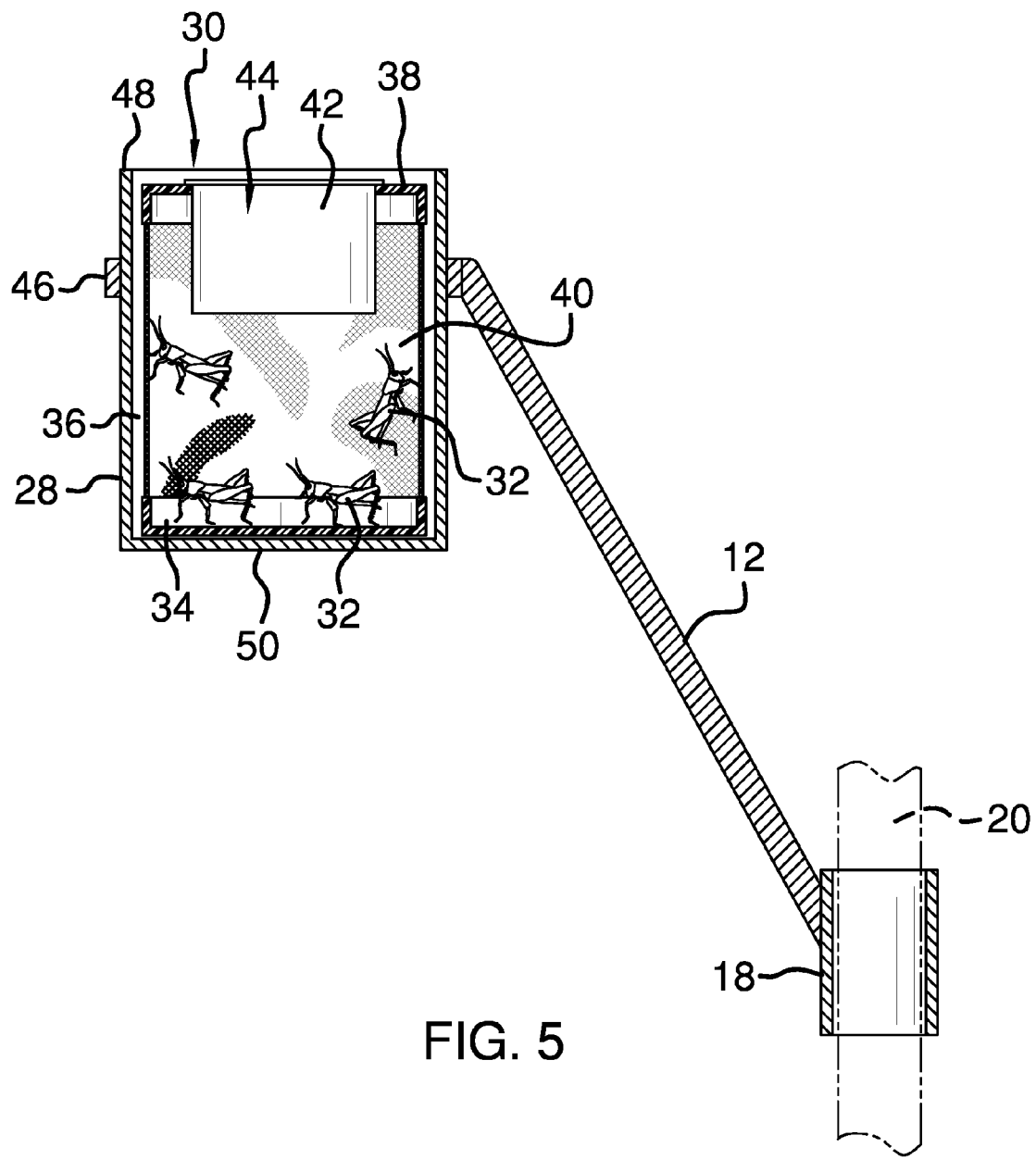
FIG. 5 is a cross-sectional view of an embodiment of the disclosure taken along line 5-5 of FIG. 4.

With reference now to the drawings, and in particular to FIGS. 1 through 5 thereof, a new bait holding device embodying the principles and concepts of an embodiment of the disclosure and generally designated by the reference numeral 10 will be described.

As best illustrated in FIGS. 1 through 5, the pedestal mountable bait holding device 10 generally comprises a rod 12 having a top end 14 and a bottom end 16. The rod 12 is elongated between the top end 14 and the bottom end 16 and may have a consistent cross-sectional shape transverse to a longitudinal axis of the rod 12. A collar 18 is coupled to the bottom end 16 of the rod 12. The collar 18 is in a fixed position relative to the rod 12 wherein the rod 12 is configured for being coupled to and extending upwardly and away from a pedestal 20 extending through the collar 18. The pedestal 20 may be a substantially vertical pole or post having a circular outer shape. The pedestal 20 may be a pre-existing base supporting a chair 22 or seat within a fishing boat 26. A bucket 28 is coupled to the top end 14 of the rod 12. The bucket 28 may be used to support various items a user might wish to have readily available while sitting in the chair 22. The device 10 may include a bait trap 30 configured for holding bait 32 such as crickets. The bait trap 30 is positionable in the bucket 28 wherein the bait trap 30 is supported in an accessible elevated position proximate the pedestal 20. The bait trap 30 comprises a bottom pan 34, a perimeter wall 36 coupled to and extending upwardly from the bottom pan 34, and a lid 38 coupled to the perimeter wall 36 defining an interior space 40 of the bait trap 30. The perimeter wall 36 of the bait trap 30 is a mesh material having a plurality of openings or apertures extending therethrough such that the interior space 40 is visible from outside the perimeter wall 36. The exterior shape of the bait trap 30 is complementary to an interior shape of the bucket 28. The lid 38 has an aperture 44 extending through the lid 38 providing access to the interior space 40. A tube 42 is coupled to the lid 38 and extends downwardly into the interior space 40 from the aperture 44 to prevent live bait such as crickets from jumping out of the bait trap 30. A band 46 is coupled between the top end 14 of the rod 12 and the bucket 28. The band 46 extends around the bucket 28. The band 46 is positioned closer to a top 48 of the bucket 28 than a bottom 50 of the bucket 28.

In use, the collar 18 is slid onto the pedestal 20 such that the rod 12 extends upwardly and away from the pedestal 20. The chair 22 is replaced on the pedestal 20. The bait trap 30 is placed into the bucket 28 where the bait within the bait trap 30 is accessible to a person sitting in or standing near the chair 22 without the person having to bend over to reach the bait trap as if it were resting on a floor of the boat 26.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A pedestal mountable bait holding device comprising:
   a rod having a top end and a bottom end;
   a collar coupled to said bottom end of said rod wherein said rod is configured for being coupled to and extending upwardly and away from a pedestal extending through said collar;
   a bucket coupled to said top end of said rod; and
   a bait trap configured for holding bait, said bait trap being positionable in said bucket wherein said bait trap is supported in an accessible elevated position proximate the pedestal, said bait trap comprising a bottom pan, a perimeter wall coupled to and extending upwardly from said bottom pan, and a lid coupled to said perimeter wall defining an interior space of said bait trap, said lid having an aperture extending through said lid providing access to said interior space, and a tube coupled to said lid and extending downwardly into said interior space.

2. The device of claim 1, further comprising a band coupled between said top end of said rod and said bucket, said band extending around said bucket.

3. The device of claim 2, further comprising said band being positioned closer to a top of said bucket than a bottom of said bucket.

4. The device of claim 1, further comprising said perimeter wall of said bait trap being a mesh material.

5. A pedestal mountable bait holding device comprising:
   a rod having a top end and a bottom end;
   a collar coupled to said bottom end of said rod wherein said rod is configured for being coupled to and extending upwardly and away from a pedestal extending through said collar;
   a bucket coupled to said top end of said rod;
   a bait trap configured for holding bait, said bait trap being positionable in said bucket wherein said bait trap is supported in an accessible elevated position proximate the pedestal, said bait trap comprising a bottom pan, a perimeter wall coupled to and extending upwardly from said bottom pan, and a lid coupled to said perimeter wall defining an interior space of said bait trap, said perimeter wall of said bait trap being a mesh material, said lid having an aperture extending through said lid providing access to said interior space, and a tube coupled to said lid and extending downwardly into said interior space; and
   a band coupled between said top end of said rod and said bucket, said band extending around said bucket, said band being positioned closer to a top of said bucket than a bottom of said bucket.

\* \* \* \* \*